(12) United States Patent
Laubenstein et al.

(10) Patent No.: US 9,800,051 B2
(45) Date of Patent: Oct. 24, 2017

(54) METHOD AND APPARATUS FOR CONTROLLING ENERGY FLOW BETWEEN DISSIMILAR ENERGY STORAGE DEVICES

(71) Applicant: EnSync, Inc., Menomonee Falls, WI (US)

(72) Inventors: Thomas A. Laubenstein, Waukesha, WI (US); Nathan Coad, Bateman (AU)

(73) Assignee: EnSync, Inc., Menomonee Falls, WI (US)

( * ) Notice: Subject to any disclaimer, the term of this patent is extended or adjusted under 35 U.S.C. 154(b) by 237 days.

(21) Appl. No.: 14/844,742

(22) Filed: Sep. 3, 2015

(65) Prior Publication Data

US 2017/0070049 A1 Mar. 9, 2017

(51) Int. Cl.
*H02J 1/10* (2006.01)
*H02J 3/38* (2006.01)
(Continued)

(52) U.S. Cl.
CPC ............. *H02J 3/382* (2013.01); *H02J 3/383* (2013.01); *H02J 3/386* (2013.01); *H02J 3/387* (2013.01); *H02J 7/0003* (2013.01); *H02J 7/35* (2013.01); *H02M 3/04* (2013.01); *H02M 7/06* (2013.01); *H02M 7/44* (2013.01)

(58) Field of Classification Search
USPC ................................. 307/26, 64, 66, 71-72
See application file for complete search history.

(56) References Cited

U.S. PATENT DOCUMENTS

| 5,369,353 A | 11/1994 | Erdman |
| 6,362,540 B1 | 3/2002 | Hill |
| (Continued) | | |

FOREIGN PATENT DOCUMENTS

| JP | 2003339118 A | 11/2003 |
| JP | 2006-129585 | 5/2006 |
| (Continued) | | |

OTHER PUBLICATIONS

International Search Report and the Written Opinion of the ISR dated Nov. 10, 2016; Application No. PCT/US16/49572—(16) pages.

*Primary Examiner* — An Luu
(74) *Attorney, Agent, or Firm* — Boyle Fredrickson, SC (57) ABSTRACT

The present invention provides an energy storage system that utilizes batteries of multiple compositions and provides improved load sharing between the different types of batteries is disclosed. The energy storage system includes at least two batteries, where each battery has a different chemical composition for storing energy. One battery is configured for rapid charging/discharging and the other batter is configured for slower charging/discharging. Each battery is connected to a common connection via an energy regulator. The regulators are initially configured such that the energy regulator connected between the common connection and the battery configured for rapid charging/discharging responds initially to changes in power demand at the common connection. If power demand continues, the first regulator decreases the amount of energy transferred between the first battery and the common connection while the second regulator begins transferring energy between the second battery and the common connection.

20 Claims, 6 Drawing Sheets

(51) Int. Cl.
*H02M 3/04* (2006.01)
*H02M 7/06* (2006.01)
*H02M 7/44* (2006.01)
*H02J 7/00* (2006.01)
*H02J 7/35* (2006.01)

(56) References Cited

U.S. PATENT DOCUMENTS

| | | | |
|---|---|---|---|
| 6,674,263 | B2 | 1/2004 | Agbossou et al. |
| 7,000,395 | B2 | 2/2006 | Wai et al. |
| 7,256,516 | B2 * | 8/2007 | Buchanan ............ B60L 11/1811 307/62 |
| 7,393,604 | B2 | 7/2008 | Rocke et al. |
| 7,411,308 | B2 | 8/2008 | Parmley |
| 7,432,691 | B2 | 10/2008 | Cutler |
| 7,436,079 | B2 | 10/2008 | Meyers et al. |
| 7,986,122 | B2 | 7/2011 | Fornage et al. |
| 8,008,808 | B2 | 8/2011 | Seeker et al. |
| 9,093,862 | B2 * | 7/2015 | Dennis ...................... H02J 1/10 |
| 2005/0200133 | A1 | 9/2005 | Robben |
| 2006/0066105 | A1 | 3/2006 | Johnson et al. |
| 2008/0129120 | A1 | 6/2008 | Su et al. |
| 2008/0143304 | A1 | 6/2008 | Bose et al. |
| 2009/0140577 | A1 | 6/2009 | Fishman |
| 2010/0009220 | A1 | 1/2010 | Higdon |
| 2010/0181837 | A1 | 7/2010 | Seeker et al. |
| 2010/0219688 | A1 | 9/2010 | Shyu et al. |
| 2010/0320837 | A1 | 12/2010 | Harrison |
| 2011/0273022 | A1 | 11/2011 | Dennis et al. |
| 2017/0070049 | A1 * | 3/2017 | Laubenstein ......... H02J 7/0003 |

FOREIGN PATENT DOCUMENTS

| | | |
|---|---|---|
| WO | 99/52193 A1 | 10/1999 |
| WO | 2009149518 A1 | 12/2009 |

* cited by examiner

METHOD AND APPARATUS FOR CONTROLLING ENERGY FLOW BETWEEN DISSIMILAR ENERGY STORAGE DEVICES

BACKGROUND OF THE INVENTION

1. Field of the Invention

The invention relates to a method and apparatus of controlling energy flow between one or more power generating sources and multiple energy storage devices. Specifically, this invention manages energy transfer between at least two dissimilar energy storage devices utilized in an energy storage system for efficient transfer of energy based on both short term and long term energy fluctuations.

2. Discussion of the Related Art

In recent years, increased demands for energy and increased concerns about supplies of fossil fuels and their corresponding pollution have led to an increased interest in renewable energy sources. Two of the most common and best developed renewable energy sources are photovoltaic energy and wind energy. Other renewable energy sources may include fuel cells, hydroelectric energy, tidal energy, and biofuel or biomass generators. However, using renewable energy sources to generate electrical energy presents certain challenges.

One of the biggest challenges for connecting renewable energy sources to existing AC grids, whether the utility grid or an off-grid system, is that renewable energy sources often provide a variable supply of energy. The supply may vary, for example, according to the amount of wind, cloud cover, or time of day. Further, different energy sources provide different types of electrical energy. A wind turbine, for example, is better suited to provide Alternating Current (AC) energy while a photovoltaic cell is better suited to provide Direct Current (DC) energy. As a result, combining multiple sources of renewable energy with other generating systems, such as the utility grid, independent micro turbines and generators, or fuel cells into a single system with an AC and/or a DC output requires integration of each of these different energy sources.

The variable nature of the energy supplied by some renewable sources may also make it desirable to integrate an energy storage device in the power system. The energy storage device may be charged during periods of peak production by the renewable source or, alternately, by the utility grid or other generating source. The energy storage device may then deliver the stored energy to supplement the renewable source when the renewable source is generating less energy than is required by the loads in a system.

Most electrical energy storage devices are batteries which convert electrical energy to potential energy via a first chemical reaction when charging the battery and perform a second chemical reaction to convert the potential energy back to electrical energy when drawing power from the battery. The two chemical reactions are intended to be complementary and reversible such that energy may repeatedly be stored and drawn from the battery. Further, different types of batteries utilize different chemicals in their respective reactions. Some chemical reactions are better suited for rapid charging and discharging while other chemical reactions are better suited for slow charging and discharging.

A power converter is typically utilized to regulate the energy flow to and from the energy storage device. In many applications, a single energy storage device may be utilized and a single power converter is provided to regulate the energy flow to that storage device. In other applications, a higher amount of energy storage may be desired and multiple energy storage devices may be needed. It is known that multiple energy storage devices may be connected in banks to a single power converter or individually to multiple power converters. Historically, however, when a higher level of energy storage is desired, a single type of battery and/or power converter is selected such that the devices may charge and discharge in a uniform manner. If batteries having different chemical compositions are selected, batteries of one composition may charge/discharge at a faster rate than batteries of another composition. As a result, batteries of one composition may be prone to failure due to excessive cycling. Batteries of the other composition may be prone to premature failure due to partial charge/discharge cycles.

Thus, it would be desirable to provide an energy storage system that utilizes batteries of multiple compositions and provides improved load sharing between the different types of batteries.

BRIEF DESCRIPTION OF THE INVENTION

Consistent with the foregoing and in accordance with the invention as embodied and broadly described herein, an energy storage system that utilizes batteries of multiple compositions and provides improved load sharing between the different types of batteries is disclosed. The energy storage system includes at least a first energy storage device and a second energy storage device, where each energy storage device utilizes a different chemical composition for storing energy. The first energy storage device may have a chemical composition which is suitable for either supplying energy from or storing energy in the energy storage device at a rapid rate, and the second energy storage device may have a chemical composition which is suitable for either supplying energy from or storing energy in the energy storage device at a slower rate. It is contemplated that each energy storage device may include multiple batteries connected in series, in parallel, or a combination thereof. One or more regulators are operatively connected to each energy storage device to transfer energy between the energy storage device and a common connection point for the energy storage system. Energy generating source may be connected to the common connection point to supply energy for charging the energy storage devices, and electrical loads may be connected to the common connection point to draw energy from the energy storage device. Each regulator is configured to operate independently of the other regulators in the energy storage system.

According to one embodiment of the invention, each regulator includes voltage setpoints which are compared to the voltage potential present at the common connection point and which are used to determine whether the energy regulator needs to transfer power to or from the energy storage device. The setpoints are initially configured such that the energy regulator connected between the common connection point and the energy storage device suitable for rapid charging/discharging responds to changes in voltage at the common connection point before the energy regulator connected between the common connection point and the energy storage device suitable for slower charging/discharging. If power is demanded at the common connection point beyond an initial duration, the setpoint in the first regulator is adjusted to a level beyond the setpoint in the second regulator such that the first regulator decreases the amount of energy being supplied by or stored in the first energy storage device and the second regulator begins supplying energy from or storing energy in the second energy storage device. If the power demand at the common connection point continues beyond a second duration, the first regulator no longer transfers energy between the first energy storage device and the common connection point, but rather, the second regulator manages the power demand by transferring energy between the common connection point and the second energy storage device. Should subsequent changes in demand occur, the first energy regulator continues to respond to the initial changes in demand and the second energy regulator responds to long-term changes in demand.

According to another embodiment of the invention, a method of controlling an energy storage system is disclosed. The energy storage system includes a first energy storage device and a second energy storage device, and the second energy storage device has a different chemical composition for storing energy than the first energy storage device. A change in power demand from the energy storage system is identified with a first regulator, where the first regulator is operatively connected between the first energy storage device and a common connection point of the energy storage system. A change in power demand from the energy storage system is also identified with a second regulator, where the second regulator is operatively connected between the second energy storage device and the common connection point of the energy storage system. Energy is transferred between the common connection point of the energy storage system and the first energy storage device via the first regulator while energy is prevented from being transfer between the common connection point of the energy storage system and the second energy storage device via the second regulator responsive to initially identifying the change in power demand. When the change in power demand continues for a first duration, the energy transferred between the common connection point of the energy storage system and the first energy storage device via the first regulator is decreased and the energy transferred between the common connection point of the energy storage system and the second energy storage device via the second regulator is increased over a second duration. When the change in power demand continues beyond the second duration, energy transfer is prevented between the common connection point of the energy storage system and the first energy storage device via the first regulator and energy is transferred between the common connection point of the energy storage system and the second energy storage device via the second regulator.

According to another aspect of the invention, the common connection point may be a common DC bus operatively connected to each of the first and second regulators. A first low voltage setpoint and a first high voltage setpoint may be set in the first regulator, and a second low voltage setpoint and a second high voltage setpoint may be set in the second regulator. The DC voltage present on the common DC bus may be monitored with each of the first regulator and the second regulator. The change in power demand from the energy storage system may be monitored with the first regulator by comparing the DC voltage present on the common DC bus to the first low and high voltage setpoints, and the change in power demand from the energy storage system may be monitored with the second regulator by comparing the DC voltage present on the common DC bus to the second low and high voltage setpoints. The first low voltage setpoint may be greater than the second low voltage setpoint and the first high voltage setpoint may be less than the second high voltage setpoint.

According to still another aspect of the invention, the second energy storage device includes a plurality of batteries and each of the plurality of batteries includes a second regulator operatively connected between the corresponding battery and the common DC bus. Each of the second regulators includes a second low voltage setpoint and a second high voltage setpoint, where at least one of the second low voltage setpoints is different than the other second low voltage setpoints and at least one of the second high voltage setpoints is different than the other second high voltage setpoints. The first low voltage setpoint is greater than each of the second low voltage setpoints and the first high voltage setpoint is less than the each of the second high voltage setpoints.

According to yet another aspect of the invention, the first regulator includes a memory storing a threshold value and a processor operable to execute a counter. When the first regulator is transferring energy between the first energy storage device and the common connection point, the processor increments the counter, compares the counter to the threshold value, and determines that the change in power demand has continued for the first duration when the counter exceeds the threshold value.

According to another embodiment of the invention, an energy storage system for bulk energy storage applications is disclosed. The energy storage system includes a first and second energy storage device and a first and second regulator. The first energy storage device has a first chemical composition and the second energy storage device has a second chemical composition, where the first and second chemical compositions define at least one energy storage characteristic of the first and second energy storage devices, respectively, and where the second chemical composition is different from the first chemical composition. The first regulator is operatively connected between the first energy storage device and a common connection point of the energy storage system, and the second regulator is operatively connected between the second energy storage device and the common connection point. The common connection point provides an electrical connection for transferring energy to and from the energy storage system. The first regulator and the second regulator each monitor a power demand at the common connection point, and the first regulator initially transfers energy between the first energy storage device and the common connection point in response to a change in the power demand. When the change in power demand continues for a first duration, the energy transfer transitions from the first regulator to the second regulator over a second duration; and when the change in power demand continues beyond the second duration, the second regulator transfers energy between the second energy storage device and the common connection point.

According to another aspect of the invention, the energy storage system includes a common DC bus, and the common connection point establishes an electrical connection between the common DC bus of the energy storage system and an external DC bus. The first regulator includes a memory and a processor. The memory is operable to store a first low voltage setpoint and a first high voltage setpoint. The processor is operable to receive a signal corresponding to a voltage present on the common DC bus, determine the change in power demand responsive to the signal corresponding to the voltage present on the common DC bus, and control the transfer of energy between the first energy storage device and the common connection point responsive to the signal corresponding to the voltage present on the common DC bus. The memory of the first regulator may also store a threshold value, and the processor of the first regulator may be further operable to increment a counter when the first regulator transfers energy between the first energy storage device and the common connection point, compare the counter to the threshold value, and determine that the change in power demand has continued for the first duration when the counter exceeds the threshold value. The second regulator may also include a memory and a processor. The memory is operable to store a second low voltage setpoint and a second high voltage setpoint. The processor is operable to receive a signal corresponding to the voltage present on the common DC bus and to control the transfer of energy between the second energy storage device and the common connection point responsive to the signal corresponding to the voltage present on the common DC bus. The first low voltage setpoint is initially set greater than the second low voltage setpoint and the first high voltage setpoint is initially set less than the second high voltage setpoint. The processor on the first regulator may adjust either the first low voltage setpoint or the first high voltage setpoint to cause the energy transfer to transition from the first regulator to the second regulator over the second duration. When adjusting the setpoints, the first low voltage setpoint may be set less than the second low voltage setpoint and the first high voltage setpoint may be set greater than the second high voltage setpoint.

According to another aspect of the invention, the energy storage system may include a central controller. The central controller includes an input operable to receive a signal corresponding to a voltage level present on the common connection point and a processor operable to generate a first control signal corresponding to desired operation of the first regulator responsive to the signal corresponding to the voltage level present on the common connection point, generate a second control signal corresponding to desired operation of the second regulator responsive to the signal corresponding to the voltage level present on the common connection point, transmit the first control signal to the first regulator, and transmit the second control signal to the second regulator.

According to yet another embodiment of the invention, a method of controlling an energy storage system is disclosed. The energy storage system includes a first energy storage device and a second energy storage device, where the second energy storage device has a different chemical composition for storing energy than the first energy storage device. A common connection point to the energy storage system is monitored for a power demand and a first level of power demanded is set equal to the power demand at the common connection point. A change in the power demand at the common connection point is detected and energy is transferred between the first energy storage device and the common connection point via a first regulator responsive to the change in power demand at the common connection point. When the power demand remains not equal to the first level of power demanded for a first duration, the energy transferred between the first energy storage device and the common connection point is decreased and energy transferred between the second energy storage device and the common connection point via a second regulator is increased over a second duration. When the power demand remains not equal to the first level of power demanded beyond the second duration, energy is transferred between the second energy storage device and the common connection point.

According to still another aspect of the invention, the first regulator includes a memory storing a threshold value and a processor operable to execute a counter. When the first regulator is transferring energy between the first energy storage device and the common connection point the processor increments the counter, compares the counter to the threshold value, and determines that the power demand has remained not equal to the first level of power demanded for the first duration when the counter exceeds the threshold value.

According to yet another aspect of the invention, the second energy storage device includes multiple batteries and each of the batteries includes a second regulator operatively connected between the corresponding battery and the common DC bus. Increasing energy transferred between the second energy storage device and the common connection point includes increasing energy transferred between at least one of the second energy storage devices and the common connection point at a different time within the second duration than increasing energy transferred between at least one other of the second energy storage devices and the common connection point.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Preferred exemplary embodiments of the invention are illustrated in the accompanying drawings in which like reference numerals represent like parts throughout, and in which:

FIG. 11B is a graphical representation of changes in power demand at the common connection point for FIG. 11a.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The present invention provides a method and apparatus of controlling an energy storage system 10. Specifically, this invention manages power flow or energy transfer among one or more power generating sources, loads, and/or the utility grid, each of which is coupled to the energy storage system 10.

Figure 1:
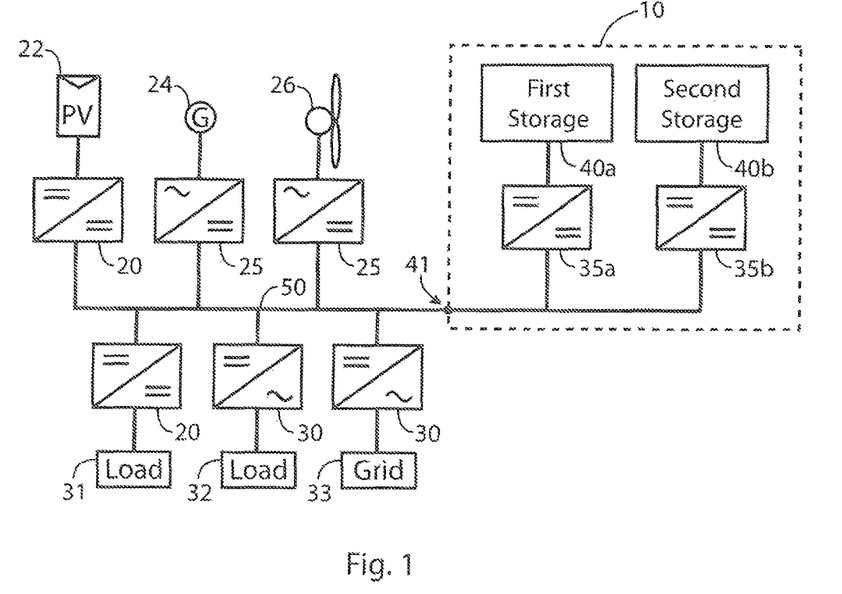
FIG. 1 is a schematic representation of an exemplary environment utilizing one embodiment of the present invention.

Referring to FIG. 1, an exemplary application of an energy storage system 10 according to one embodiment of the invention is illustrated. According to the illustrated embodiment, the energy storage system 10 is connected to multiple generating sources by a common DC bus 50. The generating source may be of any type known in the art, including but not limited to wind, photovoltaic, hydroelectric, fuel cell, tidal, biofuel or biomass generating sources. Each of these sources generates power which is output as either an AC or a DC voltage with an amplitude suited to the type of generating source. The illustrated generating sources include a photovoltaic (PV) array 22, a generator 24, and a wind turbine 26. A converter 20 is connected between the PV array 22 and the DC bus 50 to convert the amplitude of the DC voltage generated by the PV array 22 to the amplitude of DC voltage present on the DC bus 50. A rectifier 25 is connected between the generator 24 and the DC bus 50 and between the wind turbine 26 and the DC bus 50. The rectifier 25 converts the AC voltage generated by the generator 24 of by the wind turbine 26 to a DC voltage, and preferably, each rectifier 25 is an active rectifier, meaning it regulates the level of DC voltage supplied to the common DC bus 50.

Multiple loads are also connected to the energy storage system 10 via the common DC bus 50. According to the illustrated embodiment, a DC load 31 is connected to the DC bus 50 via a converter 20. The converter 20 is operable to convert the DC voltage present on the DC bus 50 to the DC voltage level required by the DC load 31. An AC load 32 is connected to the DC bus 50 via an inverter 30. The inverter converts the DC voltage present on the DC bus 50 to an AC voltage having the desired amplitude and frequency for the AC load 32. The DC bus 50 may also be connected to a utility grid 33. An inverter 30 converts the DC voltage present on the DC bus 50 to an AC voltage synchronized with the AC voltage present on the utility grid 33. It is contemplated that the converter 20 and inverters 30 may be configured to manage bi-directional power transfer between the DC bus 50 and their respective load 31, 32 or utility grid 33.

The energy storage system 10 includes at least two energy storage devices 40 connected to a common connection point 41 via a regulator 35. According to the illustrated embodiment, a first energy storage device 40a is connected to the common connection point 41 via a first regulator 35a, and a second energy storage device 40b is connected to the common connection point 41 via a second regulator 35b. It is contemplated that each energy storage device 40 may be, for example, a single device or multiple devices connected either in series or in parallel. Further, a single regulator 35 may manage power flow to each storage device 40 or to multiple storage devices 40. The common connection point 41 is connected to the DC bus 50. Consequently, each of the first and second regulators 35a, 35b converts the DC voltage present on the DC bus 50 to a DC voltage suitable for the respective energy storage device 40a, 40b. It is further contemplated that the first energy storage device 40a is a battery having a first chemical composition and the second energy storage device 40b is a battery having a second chemical composition, where the chemical composition of the second energy storage device 40b is different that the chemical composition of the first energy storage device 40a. According to one embodiment of the invention, the first energy storage device 40a includes one or more lithium-ion (Li-ion) batteries and the second energy storage device 40b includes one or more zinc-bromide (ZnBr) flow batteries. Various other chemical compositions may be utilized without deviating from the scope of the invention. According to a preferred embodiment, the chemical composition of the first energy storage device 40a is suited to handle initial charging and discharging (i.e., fast response) in response to changes in supply or demand of power at the common connection point 41, and the chemical composition of the second energy storage device 40b is suited to handle a delayed charging and discharging (i.e., slow response) to changes in supply or demand of power at the common connection point 41.

Figure 2:
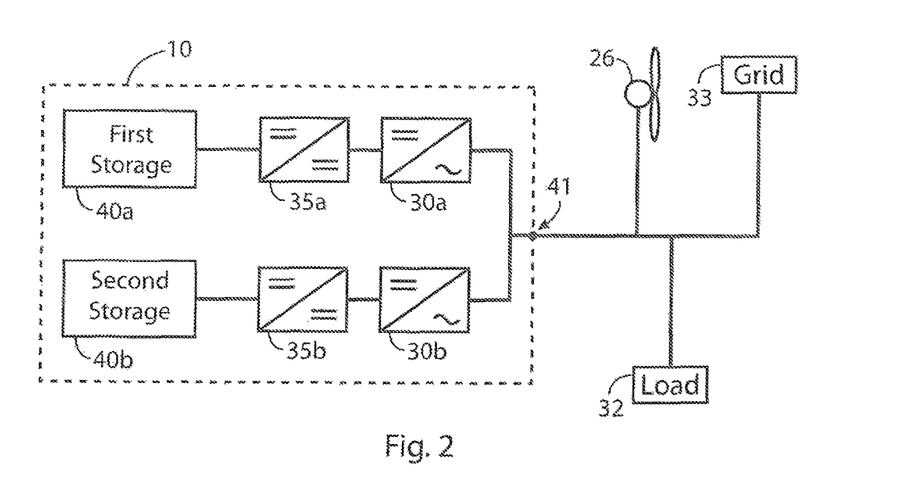
FIG. 2 is a schematic representation of another exemplary environment utilizing one embodiment of the present invention.

Referring next to FIG. 2, it is contemplated that the common connection point 41 on the energy storage system 10 may be connected to an AC output. According to the illustrated embodiment, a wind turbine 26, an AC load 32, and a utility grid 33 are each connected to the AC output. A power converter (not shown) would be connected between the wind turbine 26 and the AC output to synchronize the AC voltage generated by the wind turbine 26 to the AC voltage present on the grid 33. The energy storage system 10 includes a first regulator 35a and a first inverter 30a connected between the first energy storage device 40a and the common connection point 41. The combination of the first regulator 35a and the first inverter 30a convert the DC voltage present on the first energy storage device 40a to an AC voltage synchronized with the utility grid 33. Optionally, the first inverter 30a may be configured to directly convert the DC voltage present on the first energy storage device 40a to an AC voltage synchronized with the utility grid 33. According to still another embodiment of the invention, the first regulator 35a and the first inverter 30a may be combined into a single power conversion device. Similarly, a second regulator 35b and a second inverter 30b are connected between the second energy storage device 40b and the common connection point 41. The combination of the second regulator 35b and the second inverter 30b convert the DC voltage present on the second energy storage device 40b to an AC voltage synchronized with the utility grid 33. Optionally, the second inverter 30b may be configured to directly convert the DC voltage present on the second energy storage device 40b to an AC voltage synchronized with the utility grid 33. According to still another embodiment of the invention, the second regulator 35*b* and the second inverter 30*b* may be combined into a single power conversion device.

Figure 3:
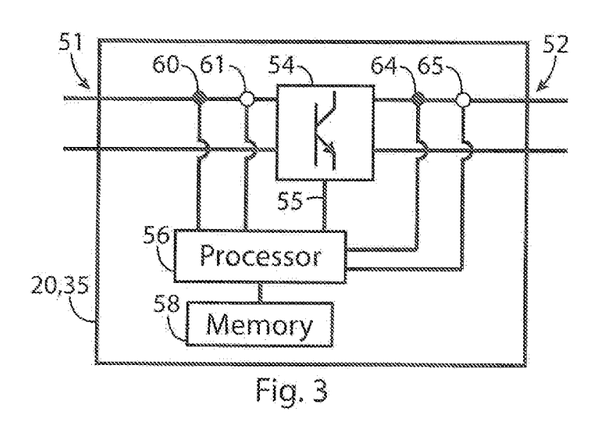
FIG. 3 is a schematic representation of a converter/regulator utilized in FIG. 1.
Figure 4:
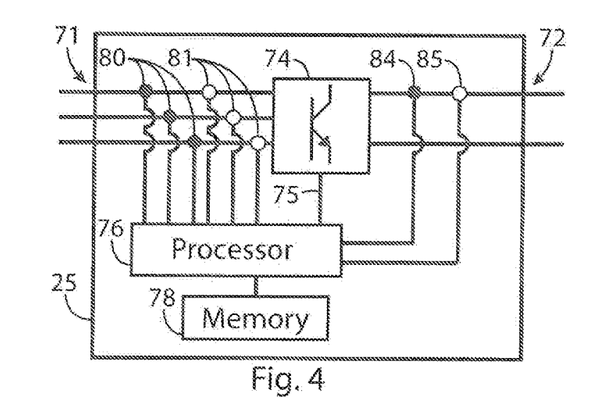
FIG. 4 is a schematic representation of a rectifier utilized in FIG. 1.
Figure 5:
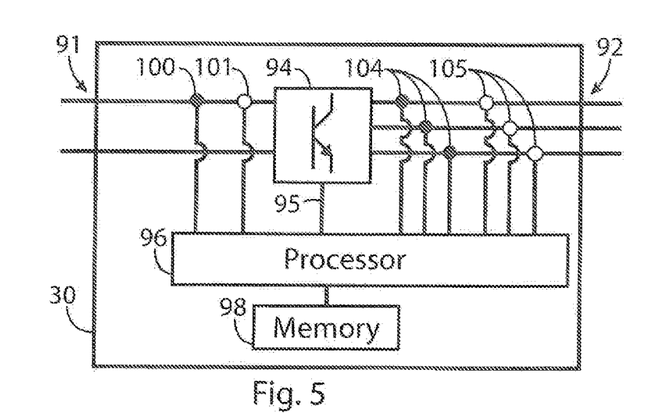
FIG. 5 is a schematic representation of an inverter utilized in FIG. 1.

Throughout this description, several terms will be used for describing the power conversion devices used to couple a generating source 22, 24, or 26; energy storage device 40; or load 31, 32 to the common DC bus 50, including: a converter 20, a rectifier 25, an inverter 30, and a regulator 35, where the regulator 35 is a converter 20 utilized by the energy storage system 10. With reference to FIGS. 3-5, several components included in each of the converters 20, rectifiers 25, and inverters 30 are illustrated in block diagram format.

Each converter 20 is configured to convert a DC voltage from a first level, present at the input 51 of the converter 20, to a second level, present at the output 52 of the converter 20. The converter 20 includes a power conversion section 54 operable to perform the conversion of the DC voltage between levels. The power conversion section 54 includes switching devices, such as silicon-controlled rectifiers (SCRs), insulated gate bipolar transistors (IGBTs), thyristors, diodes, and the like controlled by switching signals 55 generated in a processor 56. The processor 56 is operable to execute a program controlling operation of the power conversion devices and a memory 58 operable to store the program and other data. The processor 56 receives feedback signals corresponding to the voltage and/or current present on the input 51 and output 52 of the converter 20. According to the illustrated embodiment, a first voltage sensor 60 and a first current sensor 61 are each illustrated at the input 51 of the converter 20 and a second voltage sensor 64 and a second current sensor 65 are each illustrated at the output 52 of the converter 20. The actual sensors present are dependent on the program controlling operation of the power conversion devices and on which of the voltage and/or current feedback signals are required by the program.

Each rectifier 25 is configured to convert an AC voltage at the input 71 of the rectifier, the AC voltage having an amplitude and frequency which may vary as a function of the generating device to which the rectifier 25 is connected, to a DC voltage having a desired amplitude provided at the output 72 of the rectifier 25. The rectifier 25 includes a power conversion section 74 operable to perform the conversion of the AC voltage to the DC voltage. The power conversion section 74 includes switching devices, such as silicon-controlled rectifiers (SCRs), insulated gate bipolar transistors (IGBTs), thyristors, diodes, and the like controlled by switching signals 75 generated in a processor 76. The processor 76 is operable to execute a program controlling operation of the power conversion devices and a memory 78 operable to store the program and other data. The processor 76 receives feedback signals corresponding to the voltage and/or current present on the input 71 and output 72 of the rectifier 25. According to the illustrated embodiment, a set of voltage sensors 80 and a set of current sensors 81 are each illustrated at the input 71 of the rectifier 25, and a single voltage sensor 84 and a single current sensor 85 are each illustrated at the output 72 of the rectifier 25. Optionally, a single voltage sensor 80 and/or current sensor 81 may be used at the input 71 to measure a single phase of the input 71 or a pair of voltage sensors 80 and/or current sensors 81 may be used at the input 71 to measure two phases of the input 71. The actual sensors present are dependent on the program controlling operation of the power conversion devices and on which of the voltage and/or current feedback signals are required by the program.

Each inverter 30 is configured to convert a DC voltage present at the input 91 to an AC voltage present at the output 93 of the rectifier. The AC voltage has a desired amplitude and frequency which may vary as a function of the load 32 or be synchronized to a utility grid 33 to which the inverter 30 is connected. The inverter 30 includes a power conversion section 94 operable to perform the conversion of the DC voltage to the AC voltage. The power conversion section 94 includes switching devices, such as silicon-controlled rectifiers (SCRs), insulated gate bipolar transistors (IGBTs), thyristors, diodes, and the like controlled by switching signals 95 generated in a processor 96. The processor 96 is operable to execute a program controlling operation of the power conversion devices and a memory 98 operable to store the program and other data. The processor 96 receives feedback signals corresponding to the voltage and/or current present on the input 91 and output 92 of the inverter 30. According to the illustrated embodiment, a single voltage sensor 100 and a single current sensor 101 are each illustrated at the input 91 of the inverter 30, and a set of voltage sensors 104 and a set of current sensors 105 are each illustrated at the output 92 of the inverter 30. Optionally, a single voltage sensor 104 and/or current sensor 105 may be used at the output 92 to measure a single phase of the output 92 or a pair of voltage sensors 104 and/or current sensors 105 may be used at the output 92 to measure two phases of the output 92. The actual sensors present are dependent on the program controlling operation of the power conversion devices and on which of the voltage and/or current feedback signals are required by the program. The power conversion section 94 of each inverter 30 may be configured to allow bidirectional power flow between the DC input 91 and the AC output 92. The bidirectional power flow allows the utility grid 33, when connected, to supply power to the DC bus 50, supplementing the power provided by the generating sources if the demand from the loads 31, 32 exceed the power supplied by the generating sources 22, 24, 26.

In operation, the different battery compositions in the energy storage system 10 improve response to both short term and long term fluctuation in power demand from the energy storage system 10. Fluctuations in power demand may occur both from changes in power generation as well as from changes in power demanded by loads. These fluctuations may be either sudden (e.g., a step-change in power supplied or demanded) or gradual (e.g., a ramped increase or decrease of power supplied or demanded). The fluctuations may also be a combination of the two where sudden changes in supply or demand occurs at various instances in time and while a general increase or decrease in power supplied or demanded occurs over an extended period of time.

Variations in supply may be demonstrated, for example, with respect to a PV array 22. In the PV array 22 the intensity and angle of the light received at the PV array 22 can vary throughout the course of a day as the location of the sun in the sky changes. Such changes occur gradually over a long period of time and represent a long term fluctuation in power supplied. In contrast, the power generated may decrease suddenly as a cloud passes between the sun and the PV array 22 or increase suddenly as the cloud moves out from between the sun and the PV array 22. Such changes may occur suddenly and frequently throughout the course of the day. At least the initial transition of these sudden changes represents a short term fluctuation in power supply. If the cloud remains between the sun and PV array 22 for an extended duration, the change in power generated by the PV array 22 remains diminished and the change becomes a long term fluctuation in power supplied to the energy storage system 10.

Variations in demand may be demonstrated, for example, with respect to the variation in loading of a commercial building over the course of a day. Prior to the start of business hours, the commercial building may demand very little energy. The lights may be off and cooling and/or heating systems may be set by an automatic thermostat to require little cooling or heating while the building is vacant. In advance of the start of business, the cooling or heating systems may be commanded to adjust the temperature within the building to a comfortable level. As people arrive and throughout business hours, lights as well as computers and other office equipment are turned on. As each load is turned on, a sudden increase in demand is required. However, the overall demand for energy from the commercial building is increased as well throughout business hours. Conversely, as people leave the building at the end of the day, the lights, computers, and office equipment are turned off and the temperature may be reset to a temperature requiring less heating or cooling. As each load is turned off, a sudden decrease in demand occurs and the overall demand for energy from the commercial building decreases after business hours.

These variations in demand are detected by monitoring the common connection point 41 of the energy storage system 10. According to the embodiment illustrated in FIG. 1, the common connection point 41 is connected to the common DC bus 50. Absent any action taken by another device, an increase in power generated by one of the energy generating devices 22, 24, 26 will cause the voltage level on the common DC bus 50 to increase, and a decrease in power generated by one of the energy generating devices 22, 24, 26 will cause the voltage level on the common DC bus 50 to decrease. If the energy supplied by the energy generating devices 22, 24, 26 remains constant, a decrease in the energy demanded by the loads 31, 32 will cause an increase in the voltage level on the common DC bus 50, and an increase in the energy demanded by the loads 31, 32 will cause a decrease in the voltage level on the common DC bus 50. The change in the voltage level on the common DC bus 50 will be present at the common connection point 41 for the energy storage system 10.

It is contemplated that the input 51 of each regulator 35 is connected to the common connection point 41 and the output 52 of each regulator 35 is connected to the corresponding energy storage device 40a, 40b. Because the regulator 35 can manage bidirectional power transfer between the input 51 and the output 52, the input 51 of each regulator 35a, 35b may be connected to the corresponding energy storage device 40a, 40b and the output 52 of each regulator 35 may be connected to the common connection point 41. If the input 51 of each regulator 35 is connected to the common connection point 41 and, therefore, to the common DC bus 50, the processor 56 of each regulator 35a, 35b receives a signal from the voltage sensor 60 corresponding to the voltage present on the shared DC bus 50. Each regulator 35 is preferably configured to operate independently of the other regulator 35 and to transfer energy between its corresponding energy storage device 40 and the common DC bus 50 according to a number of setpoints.

Figure 8:
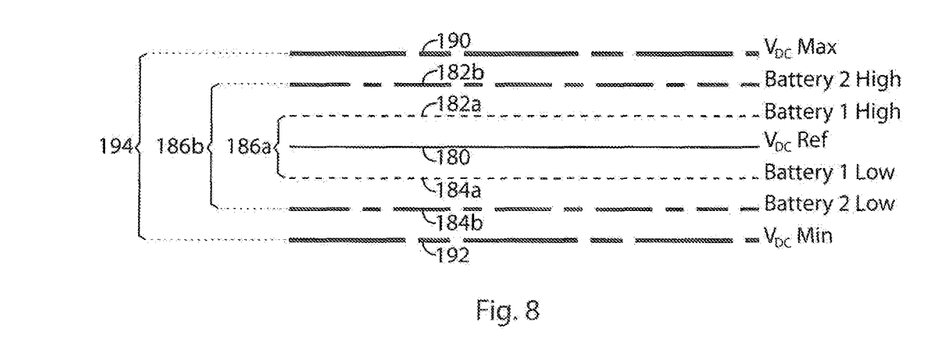
FIG. 8 is a graphical representation of voltage setpoints for the two regulators of FIG. 1 according to one embodiment of the invention.

According to one embodiment of the invention and with reference to FIG. 8, each regulator 35 includes at least a reference setpoint 180, a high voltage setpoint 182, and a low voltage setpoint 184. The reference setpoint 180 defines a desired voltage level for the DC bus 50, and the high and low voltage setpoints 182, 184 define a voltage band 186 within which each regulator 35 will attempt to keep the voltage level on the DC bus 50. According to the illustrated embodiment, the first regulator 35a has a first high voltage setpoint 182a and a first low voltage setpoint 184a, defining a first voltage band 186a for the energy storage system 10. The second regulator 35b has a second high voltage setpoint 182b and a second low voltage setpoint 184b, defining a second voltage band 186b for the energy storage system 10. In addition, a maximum voltage setpoint 190 and a minimum voltage setpoint 192 may be defined to identify a safe operating range 194 in which the regulator 35 can transfer energy between the DC bus 50 and the energy storage device 40.

Figure 6:
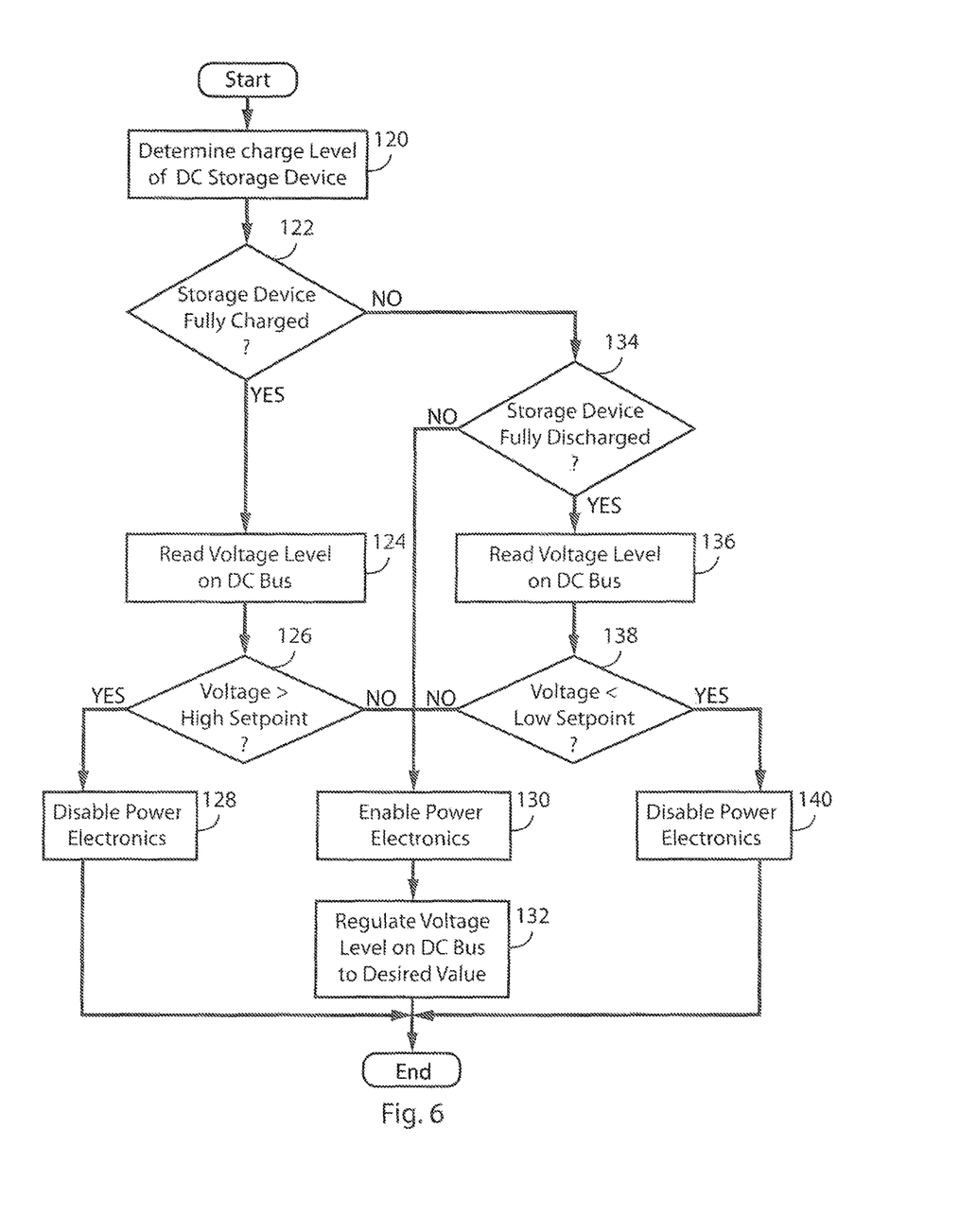
FIG. 6 is a flowchart illustrating operation of the converter/regulator of FIG. 3 according to one embodiment of the invention.

With reference also to FIG. 6, operation of each regulator 35 is responsive to the level of voltage present on the common DC bus 50 and the voltage setpoints 182, 184. Each of the regulators 35a, 35b receives a separate signal corresponding to the level of voltage on the DC bus at their respective processor 56 from the respective voltage sensor 60. Each regulator 35a, 35b also monitors the level of charge in the corresponding energy storage device 40a, 40b, as shown in step 120. The level of charge may be determined, for example, by reading the level of voltage present at the energy storage device 40 according to the signal from the voltage sensor 64 at the output 52 of each regulator 35. At step 122, the processor 56 in the regulator 35 determines whether the storage device 40 is fully charged. In order to determine whether the storage device 40 is fully charged, the memory 58 in the regulator 35 may store a value corresponding to the maximum charge of the energy storage device 40 and compare the voltage received from the voltage sensor 64 to the stored value. If the storage device 40 is fully charged, it is unable to accept further energy from the DC bus 50. If the voltage level on the DC bus 50 exceeds the high voltage setpoint 142 while the storage device 40 is fully charged, the power electronics 38 are disabled to prevent additional power flow to the storage device 40, as illustrated in steps 124, 126, and 128. However, if the voltage level on the DC bus 50 is less than the high voltage setpoint 142 and the storage device 40 is fully charged, the power electronics 38 are enabled to allow transfer of energy from the storage device 40 to the DC bus 50 as required, as shown in steps 126, 130, and 132.

If the regulator 35 determines the storage device 40 is not fully charged at step 122, the regulator 35 determines whether the storage device 40 is fully discharged, as shown in step 134. In order to determine whether the storage device 40 is fully discharged, the regulator 35 may compare the signal from the voltage sensor 64 to zero or to a minimum operating voltage, which may also be stored in the memory 58 of the regulator 35. If the voltage level on the DC bus 50 drops below the low voltage setpoint while the storage device 40 is fully discharged, the power electronics 38 are disabled because the storage device 40 is unable to supply energy to the DC bus 50, as illustrated in steps 136, 138, and 140. However, if the voltage level on the DC bus 50 is greater than the low voltage setpoint and the storage device 40 is fully discharged, the power electronics 38 are enabled to allow transfer of energy from the DC bus 50 to the energy storage device 40, as required, as shown in steps 138, 130, and 132. If the storage device 40 is neither fully charged nor fully discharged, the regulator 35 is enabled to manage energy transfer between the storage device 40 and the DC bus 50, as shown in steps 130 and 132. The processor 56 in each regulator 35 transfers energy between the DC bus 50 and the energy storage device 40 in order to keep the voltage level on the DC bus 50 at the reference setpoint 180 and within the voltage band 186 stored in memory 58 as a function of the measured DC Bus voltage.

Referring again to FIG. 8, each of the first regulator 35a and the second regulator 35b may be configured to operate at different voltage bands 186a, 186b. As previously discussed, the first energy storage device 40a has a first chemical composition and is suited to handle initial charging and discharging (i.e., fast response) in response to changes in supply or demand of power at the common connection point 41, and the second energy storage device 40b has a second chemical composition and is suited to handle a delayed charging and discharging (i.e., slow response) to changes in supply or demand of power at the common connection point 41. As a result, the first high voltage setpoint 182a is initially set less than the second high voltage setpoint 182b. As the power available on the common DC bus 50 increases, the voltage level on the DC bus increases. When the voltage level exceeds the first high voltage setpoint 182a, the first regulator 35a begins transferring power from the common DC bus 50 to the first energy storage device 40a, as discussed above with respect to FIG. 6, to keep the voltage on the DC bus 50 at the voltage reference setpoint 180. If the change in power available on the DC bus 50 exceeds the capacity of the first energy regulator 35a and the first energy storage device 40a to manage, the level of voltage on the DC bus 50 will continue to rise until it hits the second high voltage setpoint 182b. When the voltage level on the DC bus 50 exceeds the second high voltage setpoint 182b, the second regulator 35b also begins transferring power from the common DC bus 50 to the second energy storage device 40b, as discussed above with respect to FIG. 6, to keep the voltage on the DC bus 50 at the voltage reference setpoint 180. Similarly, the first low voltage setpoint 184a is initially set greater than the second low voltage setpoint 184b. As the power available on the common DC bus 50 decreases, the voltage level on the DC bus decreases. When the voltage level falls below the first low voltage setpoint 184a, the first regulator 35a begins transferring power from the first energy storage device 40a to the common DC bus 50, as discussed above with respect to FIG. 6, to keep the voltage on the DC bus 50 at the voltage reference setpoint 180. If the change in power available on the DC bus 50 exceeds the capacity of the first energy regulator 35a and first energy storage device 40a to manage, the level of voltage on the DC bus 50 will continue to fall until it hits the second low voltage setpoint 184b. When the voltage level on the DC bus 50 falls below the second low voltage setpoint 184b, the second regulator 35b also begins transferring power from the second energy storage device 40b to the common DC bus 50, as discussed above with respect to FIG. 6, to keep the voltage on the DC bus 50 at the voltage reference setpoint 180.

Although, the above-described operation allows the second energy storage device 40b to complement the first energy storage device 40a during significant fluctuations in power on the DC bus 50, the energy storage system 10 is preferably configured such that the first energy storage device 40a is sized to handle full-load power according to the ratings of the energy storage system 10. If the high and low voltage setpoints 182, 184 for each regulator are held constant and the first energy storage device 40a is sized to handle full-load power, the second energy regulator 35b would be required to manage little to no energy transfer between the common DC bus 50 and the second energy storage device 40b. In order to utilize the fast and slow response characteristics of the first and second energy storage devices 40a, 40b, the processor 56 in the regulator 35 adjusts the setpoints 182, 184 of at least one regulator 35 to control which regulator 35 is used to transfer energy between the common DC bus 50 and its corresponding energy storage device 40.

Figure 7:
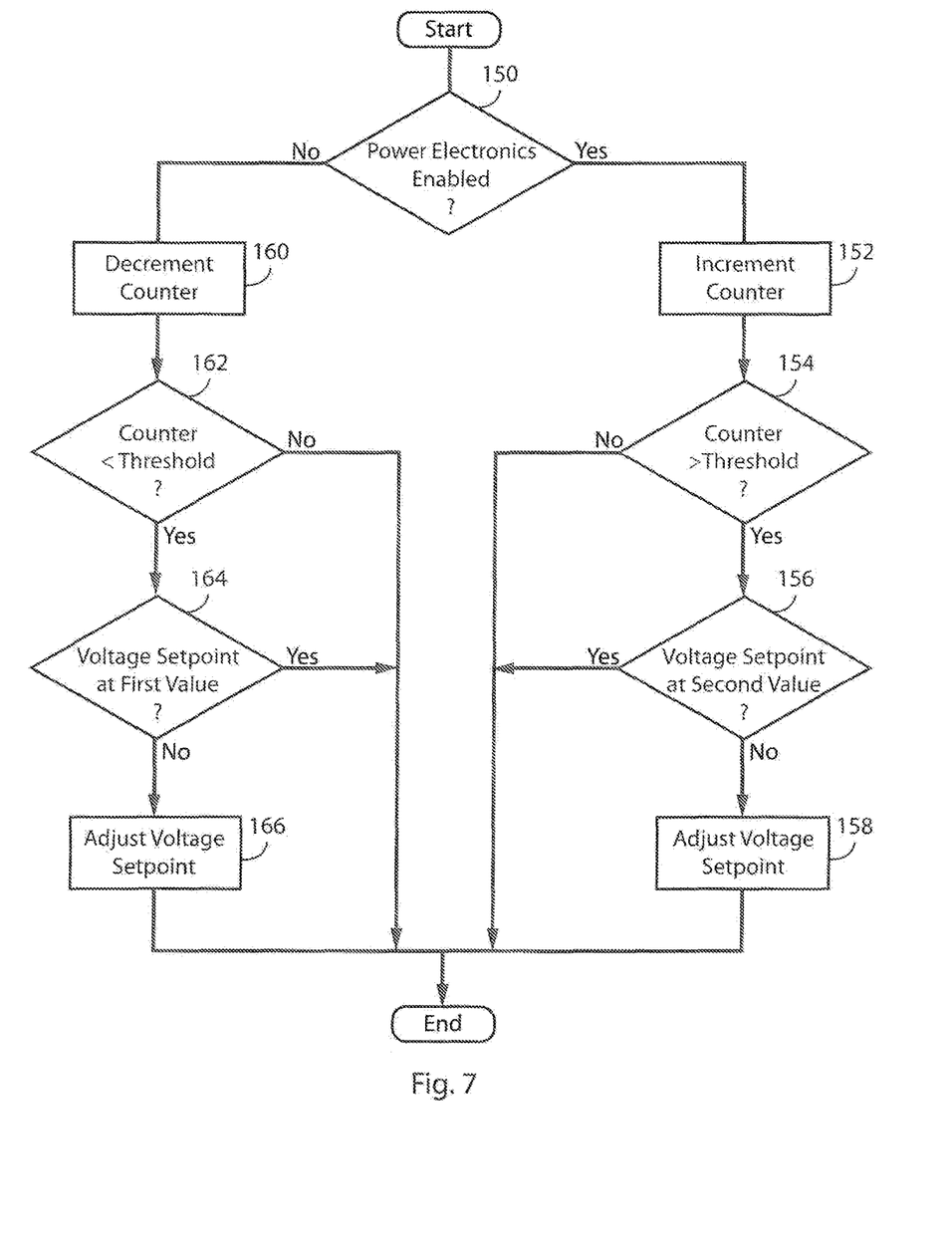
FIG. 7 is a flowchart of a points system implemented in the converter/regulator of FIG. 3 according to one embodiment of the invention.
Figure 11A:
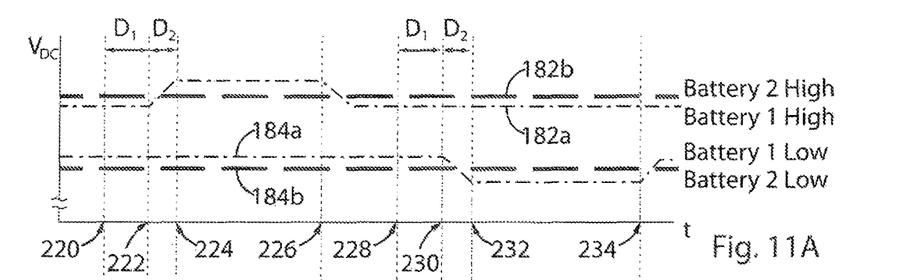
FIG. 11A is a graphical representation of the regulator adjusting the voltage setpoints responsive to a change in power demand at the common connection point according to one embodiment of the invention.

According to one embodiment of the invention, the energy storage system 10 utilizes a point system by which the high and low voltage setpoints 182, 184 of at least one regulator 35 is adjusted. Turning next to FIG. 7, an exemplary points system is illustrated. At step 150, the processor 56 monitors when the power conversion section 54 for the regulator 35 is enabled (e.g., step 130 of FIG. 6). If the power conversion section 54 is enabled to transfer power in either direction between the common DC bus 50 and the energy storage device 40, a counter is incremented, as shown in step 152. At step 154, the processor 56 compares the counter to a threshold, where the threshold value is stored in memory 58. When the counter is below the threshold value, the regulator 35 continues to operate with the initial high and low voltage setpoints 182, 184, thereby, allowing the first energy storage device 40a to manage short term fluctuations in power at the DC bus 50. If the power demand on the common DC bus 50 causes the counter to continuously increment, the threshold value and counter increment are configured such that the counter executed for a first duration, $D_1$, as shown in FIG. 11A. When the counter reaches the threshold value, the regulator 35 begins adjusting at least one of the voltage setpoints 182, 184.

Preferably, the transition between the first regulator 35a and the second regulator 35b occurs over a second duration, $D_2$, rather than in an instantaneous manner. The voltage setpoints 182, 184 may be incrementally changed over a second duration, $D_2$, such that the voltage setpoint changes from a first value to a second value, as shown in steps 156 and 158. Optionally, the voltage setpoints 182, 184 may be changed in a step-wise manner between the initial value and a new value and a current control loop within the regulator 35 may be used to gradually decrease the power transferred via the first regulator 35a and increase the power transferred via the second regulator 35b.

If, at step 150, the processor 56 detects that the power conversion section 54 is no longer enabled, then the regulator 35 is not managing power transfer between the common DC bus 50 and the energy storage device 40. The processor 56 begins decrementing the counter, as shown in step 160, to permit the first regulator 35a to handle subsequent short term power demands. If the counter is above the threshold, a recent power transfer occurred and the voltage setpoint remains the same. If the power conversion section 54 remains disabled, decrementing the counter brings the counter below the first threshold. At step 162, the processor detects when the counter is below the threshold value. It is understood that the threshold value for incrementing and decrementing may be the same value or, optionally, may be different values such that the regulator 35 does not repeatedly switch between operating modes with single, or small, fluctuations in the counter value. When the counter drops below the threshold value, the regulator 35 begins adjusting at least one of the voltage setpoints inversely to its prior adjustment to return the voltage setpoint from the second setting to its initial value, as shown in steps 164 and 166.

Figure 11B:
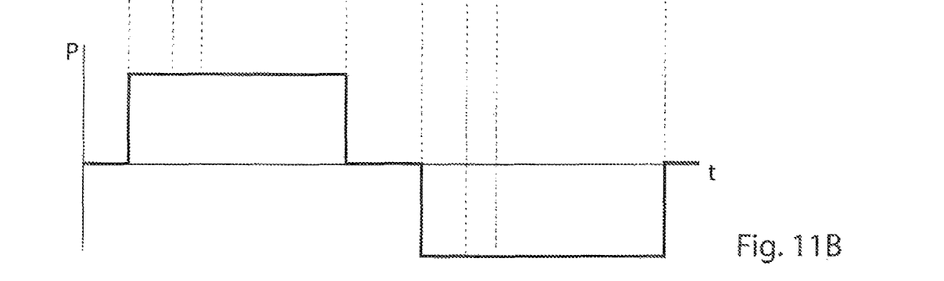

Turning next, to FIGS. 11A and 11B, operation of one embodiment of the points system is illustrated. Initially, the first high voltage setpoint 182a is set below the second high voltage setpoint 184a such that the first regulator 35a and the first energy storage device 40a are responsive to a change in the DC bus voltage before the second regulator 35b and the second energy storage device 40b. At time 220, a step increase in power, P, present on the DC bus 50 occurs. The first regulator 35a detects an increase in voltage on the DC bus 50 responsive to the step increase in power and begins transferring power from the DC bus 50 to the first energy storage device 40a. The first regulator 35a and first energy storage device 40a are capable of absorbing the increase power and, therefore, regulate the voltage on the DC bus 50 below the second high voltage threshold 182b of the second regulator 35b. However, the counter, as described with respect to FIG. 7, begins incrementing in the first regulator 35a in response to the activation of the power conversion section 54. The counter continues incrementing throughout the first duration, D1, during which time the first regulator 35a and the first energy storage device 40a continue to transfer power from the DC bus 50 to the first energy storage device 40a. At time 222, the counter exceeds the threshold and the first regulator 35a begins adjusting the first high voltage setpoint 182a. During the second duration, $D_2$, the first high voltage setpoint 182a transitions between the initial value and the second value, such that the first high voltage setpoint 182a is greater than the second high voltage setpoint 182b.

During this transition, the second regulator 35b and the second energy storage device 40b begin absorbing some of the power from the DC bus 50 when the first high voltage setpoint 182a initially becomes greater than the second high voltage setpoint 182b. Because the second energy storage device 40b has a slower response, the second regulator 35b is configured to ramp up the current and, therefore, the power transferred from the DC bus 50 to the second energy storage device 40b. As a result, the first regulator 35a continues increasing the first high voltage setpoint for a short time until the second energy storage device 40b fully takes over transferring the power, P, from the DC bus 50 to the second energy storage device 40b. At time 226, the increase in power, P is removed and the first high voltage setpoint 182a transitions from the second value back to its initial value such that the first regulator 35a and first energy storage device 40a are ready to respond to subsequent increases in power. Further, if additional increases in power occur while the first high voltage setpoint 182a is greater than the second high voltage setpoint 182b, the voltage level on the DC bus 50 will increase and the first regulator 35a will begin transferring power from the DC bus 50 to the first energy storage device 40a. Thus, the first regulator 35a and first energy storage device 40a respond initially to the change in power, P, and the second regulator 35b and the second energy storage device 40b respond to a sustained change in power, P. A similar process is illustrated at times 228-234 for a step decrease in power, P, where the first low voltage setpoint 184a is adjusted between its initial value and a second value.

The points system is described above according to one embodiment in which counters are employed to monitor utilization of the energy storage device 40 and regulator 35. In addition to monitoring utilization, the point system is used to establish the priority of which energy storage device 40 is utilized and when. For example, the point system permits the first regulator 35a to transfer energy between the first energy storage device 40a and the DC bus 50 before the second regulator 35b transfers energy between the second energy storage device 40b and the DC bus 50. Each regulator 35 implementing a point system determines whether energy is transferred to the energy storage device 40 to which it is connected and for how long. Further, the point system may utilize other methods of monitoring utilization including, for example, timers, sensors detecting the magnitude of power transferred in conjunction with the duration for which the power is transferred, and/or sensors detecting the level of charge present in each energy storage device 40.

Figure 9:
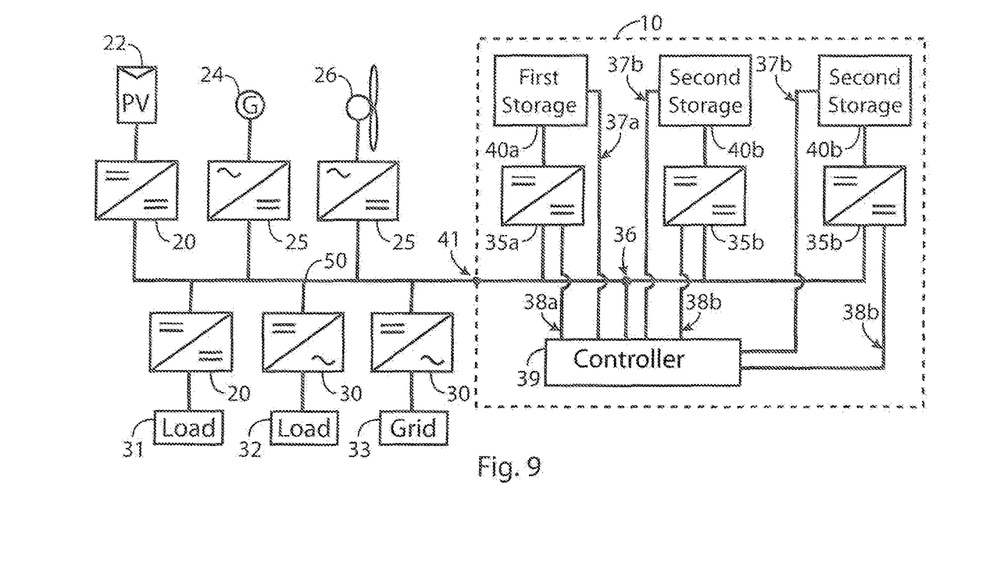
FIG. 9 is a schematic representation of another exemplary environment utilizing one embodiment of the present invention.
Figure 10:
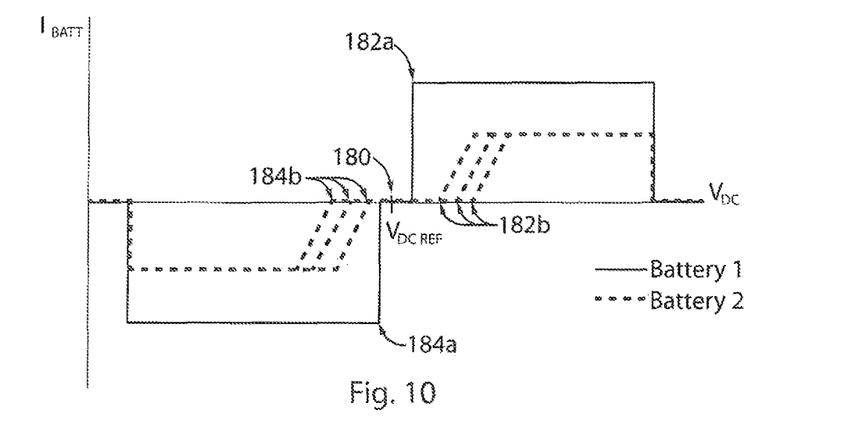
FIG. 10 is a graphical representation of the current drawn by the energy storage devices responsive to a change in voltage at the common connection point according to one embodiment of the invention.

With reference next to FIGS. 9 and 10, multiple second storage devices 40b and multiple second energy regulators 35b may be implemented to provide increased energy storage capacity. Although not illustrated, it is further contemplated that multiple first storage devices 40a and multiple first energy regulators 35a may also be utilized without deviating from the scope of the invention. Operation of multiple first storage devices 40a and multiple first energy regulators 35a would be similar to that of multiple second storage devices 40b and multiple second energy regulators 35b as discussed in more detail below. The voltage setpoints for the different second energy regulators 35b may be set to different values, allowing one of the second storage devices 40b to be brought online at a time. If the power change is sustained and/or of sufficient magnitude the voltage level on the DC bus 50 will continue to change until there is sufficient storage capacity enabled either to draw the additional supply from the DC bus 50 or supply the additional demand to the DC bus 50. The first energy storage device 40a is responsive to the initial change in demand as illustrated by the step change in current for Battery 1 when the DC voltage moves away from the voltage reference setpoint 180 and reaches either the first high voltage setpoint 182a or the first low voltage setpoint 184a. If the capacity of the first energy storage device 40a is sufficient to manage the change in power demand, the voltage level on the DC bus will stop increasing/decreasing and remain between the first and second high or low voltage setpoints. If either (1) the capacity of the first energy storage device 40a is not sufficient to manage the change in power or (2) the change in power demand has continued for at least the first duration, D1, such that the first high or low voltage setpoint 182a, 184a in the first regulator 35a begins to shift beyond the second high or low voltage setpoint 182b, 184b; then the second energy storage device(s) 40b will begin to help manage the power demand on the DC bus 50. If only one second energy storage device 40b and one second regulator 35b is present, a single curve for Battery 2 would be shown in FIG. 10. If multiple second energy storage devices 40b and second regulators 35b are present, the second high and low voltage setpoints 182b, 184b may be set differently such that one pair of second energy storage device 40b and second regulator 35b begins managing power demand on the DC bus 50 at a time. As shown in FIG. 10, each of the second regulators 35b ramp up the current and, therefore, the power transferred between the corresponding second energy storage device 40b and the common DC bus 50 until a maximum transfer is reached. Each subsequent pair of second energy storage device 40b and second regulator 35b is ramped up in a similar manner until all of the second energy storage devices 40b are helping manage power demand on the common DC bus 50. It is contemplated that one, a portion of, or all of the second energy storage devices 40b may be utilized at a time according to the power requirements on the DC bus 50. It is further contemplated that each of the second regulators 35b may include a counter function similar to that described above with respect to the first regulator 35a. Rather than switching in a different energy storage device 40, the counter function in the second regulator 35b may be configured to change the second high or low voltage setpoint 182b, 184b of one second regulator 35b above/below that of another second regulator 35b, such that different second regulators 35*b* and second energy storage devices 40*b* may be switched on/off to manage power demand on the common DC bus 50.

When multiple energy storage devices 40 of either composition and corresponding regulators 35 are present, the point system may be utilized to establish a priority among the similar energy storage devices 40 and their corresponding regulators 35 to determine the order in which each of the regulator 35 begins regulating energy flow between the DC bus 50 and similar energy storage devices 40. If, for example, multiple first regulators 35*a* and multiple first energy storage devices 40*a* are present, the points system may be set up such that one of the first regulators 35*a* initially begins regulating energy between its corresponding energy storage device 40*a* and the DC bus 50. Based on utilization and/or charge level, the points system may cause the first regulator 35*a* to adjust its voltage levels such that another first regulator 35*a* begins regulating energy between its corresponding energy storage device 40*a* and the DC bus 50. Further, each of the first regulators 35*a* may become active sequentially if the change in power demand is significant and/or the duration of the change is large. When the utilization of each of the first energy storage devices 40*a* reaches a predefined level, energy regulation may be transferred from the first regulators 35*a* to the second regulators 35*b* such that utilization of the second energy storage devices 40*b* begins.

Each of the regulators 35 are configured to repeatedly execute the steps of FIGS. 6 and 7 such that the regulator 35 is continuously monitoring the voltage on the DC bus 50 and responding appropriately. In this manner, the regulator 35 and storage device 40 operate to regulate the amplitude of the DC bus 50 within a desired voltage band 186. The storage device 40 is preferably sized such that it generally remains in a partially charged state, receiving energy from the DC bus 50 when the generated power exceeds the demands from the loads and supplying energy to the DC bus 50 when the loads demand more energy than is provided by the generating sources.

Referring again to FIG. 9, the energy storage system 10 may include a central controller 39. The central controller 39 may be located proximate to or incorporated within the energy storage system 10. Optionally, the central controller 39 may be located remotely from the energy storage system 10 and connected via any suitable wired or wireless network. The central controller 39 is also in communication with each of the regulators 35 via a suitable connection 38. Each connection 38 may be discrete conductors providing one or more command signals between the central controller 39 and each regulator 35 or, optionally, each connection 38 may be a suitable network including, for example, Ethernet, EtherNet/IP, or any other industrial communications network. The central controller 39 receives a signal from a voltage sensor 36 connected to the DC bus 50 corresponding to the voltage level on the DC bus 50. According to one embodiment of the invention, the central controller 39 is a circuit that transmits the signal from the voltage sensor 36 to each regulator 35. According to another embodiment of the invention, the central controller 39 includes a display device and a user interface, including but not limited to, a keypad, a mouse, a touchpad, or a touchscreen. The central controller 39 further includes a memory device storing a copy of each of the setpoints 182, 184 for the regulators 35 and a processor operable to execute instructions stored on the memory device. The user interface and display device permit a user to configure the setpoints and transmit new values for any of the setpoints to the regulators 35 via the communication connections 38.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method of controlling an energy storage system, wherein the energy storage system includes a first energy storage device and a second energy storage device and wherein the second energy storage device has a different chemical composition for storing energy than the first energy storage device, the method comprising:
    identifying a change in power demand from the energy storage system with a first regulator, wherein the first regulator is operatively connected between the first energy storage device and a common connection point of the energy storage system;
    identifying the change in power demand from the energy storage system with a second regulator, wherein the second regulator is operatively connected between the second energy storage device and the common connection point of the energy storage system;
    transferring energy between the common connection point of the energy storage system and the first energy storage device via the first regulator responsive to initially identifying the change in power demand;
    preventing energy transfer between the common connection point of the energy storage system and the second energy storage device via the second regulator responsive to initially identifying the change in power demand;
    when the change in power demand continues for a first duration, decreasing the energy transferred between the common connection point of the energy storage system and the first energy storage device via the first regulator over a second duration;
    when the change in power demand continues for the first duration, increasing the energy transferred between the common connection point of the energy storage system and the second energy storage device via the second regulator over the second duration;
    when the change in power demand continues beyond the second duration, preventing energy transfer between the common connection point of the energy storage system and the first energy storage device via the first regulator; and
    when the change in power demand continues beyond the second duration, transferring energy between the common connection point of the energy storage system and the second energy storage device via the second regulator.

2. The method of claim 1 wherein the common connection point is a common DC bus operatively connected to each of the first and second regulators.

3. The method of claim 2 further comprising the steps of:
setting a first low voltage setpoint and a first high voltage setpoint in the first regulator,
setting a second low voltage setpoint and a second high voltage setpoint in the second regulator; and
monitoring a DC voltage present on the common DC bus with each of the first regulator and the second regulator, wherein:
the step of identifying the change in power demand from the energy storage system with the first regulator includes comparing the DC voltage present on the common DC bus to the first low voltage setpoint and to the first high voltage setpoint, and
the step of identifying the change in power demand from the energy storage system with the second regulator includes comparing the DC voltage present on the common DC bus to the second low voltage setpoint and to the second high voltage setpoint.

4. The method of claim 3 wherein the first low voltage setpoint is greater than the second low voltage setpoint and the first high voltage setpoint is less than the second high voltage setpoint.

5. The method of claim 3 wherein:
the second energy storage device includes a plurality of batteries;
each of the plurality of batteries includes a second regulator operatively connected between the corresponding battery and the common DC bus;
each of the second regulators includes a second low voltage setpoint and a second high voltage setpoint;
at least one of the second low voltage setpoints is different than the other second low voltage setpoints;
at least one of the second high voltage setpoints is different than the other second high voltage setpoints; and
the first low voltage setpoint is greater than each of the second low voltage setpoints and the first high voltage setpoint is less than the each of the second high voltage setpoints.

6. The method of claim 1 wherein the first regulator includes a memory storing a threshold value and a processor operable to execute a counter and wherein when the first regulator is transferring energy between the first energy storage device and the common connection point the method further comprises the steps of:
incrementing the counter with the processor;
comparing the counter to the threshold value; and
determining that the change in power demand has continued for the first duration when the counter exceeds the threshold value.

7. The method of claim 1 wherein the energy storage system further includes a central controller in communication with the first regulator and the second regulator, further comprising the steps of:
identifying a change in power demand at the common connection point with the central controller, wherein the steps of identifying the change in power demand with the first and second regulators include receiving a signal from the central controller corresponding to the change in power demand; and
monitoring the duration for which the first regulator and the second regulator transfer energy between the common connection point and the first energy storage device and the second energy storage device, respectively, with the central controller wherein the central controller generates control signals to each of the first and second regulators to control operation of the first and second regulators.

8. An energy storage system for bulk energy storage applications, the energy storage system comprising:
a first energy storage device having a first chemical composition, wherein the first chemical composition defines at least one energy storage characteristic of the first energy storage device;
a second energy storage device having a second chemical composition wherein the second chemical composition defines at least one energy storage characteristic of the second energy storage device, and wherein the second chemical composition is different from the first chemical composition;
a first regulator operatively connected between the first energy storage device and a common connection point, wherein the common connection point provides an electrical connection for transferring energy to and from the energy storage system; and
a second regulator operatively connected between the second energy storage device and the common connection point, wherein:
the first regulator and the second regulator each monitor a power demand at the common connection point,
the first regulator initially transfers energy between the first energy storage device and the common connection point in response to a change in the power demand,
when the change in power demand continues for a first duration, the energy transfer transitions from the first regulator to the second regulator over a second duration, and
when the change in power demand continues beyond the second duration, the second regulator transfers energy between the second energy storage device and the common connection point.

9. The energy storage system of claim 8 further comprising a common DC bus, wherein the common connection point establishes an electrical connection between the common DC bus of the energy storage system and an external DC bus.

10. The energy storage system of claim 9 wherein the first regulator includes:
a memory operable to store a first low voltage setpoint and a first high voltage setpoint, and
a processor operable to:
receive a signal corresponding to a voltage present on the common DC bus,
determine the change in power demand responsive to the signal corresponding to the voltage present on the common DC bus, and
control the transfer of energy between the first energy storage device and the common connection point responsive to the signal corresponding to the voltage present on the common DC bus.

11. The energy storage system of claim 10 wherein:
the memory of the first regulator is further operable to store a threshold value, and
the processor of the first regulator is further operable to:
increment a counter when the first regulator transfers energy between the first energy storage device and the common connection point,
compare the counter to the threshold value, and
determine that the change in power demand has continued for the first duration when the counter exceeds the threshold value.

12. The energy storage system of claim 10 wherein the second regulator includes:
  a memory operable to store a second low voltage setpoint and a second high voltage setpoint, and
  a processor operable to:
    receive a signal corresponding to the voltage present on the common DC bus, and
    control the transfer of energy between the second energy storage device and the common connection point responsive to the signal corresponding to the voltage present on the common DC bus, wherein the first low voltage setpoint is initially set greater than the second low voltage setpoint and the first high voltage setpoint is initially set less than the second high voltage setpoint.

13. The energy storage system of claim 12 wherein the processor on the first regulator adjusts one of the first low voltage setpoint and the first high voltage setpoint to cause the energy transfer to transition from the first regulator to the second regulator over the second duration, wherein the first low voltage setpoint is set less than the second low voltage setpoint when the first low voltage setpoint is adjusted and the first high voltage setpoint is set greater than the second high voltage setpoint when the first high voltage setpoint is adjusted.

14. The energy storage system of claim 8 further comprising a central controller, wherein the central controller includes:
  an input operable to receive a signal corresponding to a voltage level present on the common connection point; and
  a processor operable to:
    generate a first control signal corresponding to desired operation of the first regulator responsive to the signal corresponding to the voltage level present on the common connection point;
    generate a second control signal corresponding to desired operation of the second regulator responsive to the signal corresponding to the voltage level present on the common connection point;
    transmit the first control signal to the first regulator; and
    transmit the second control signal to the second regulator.

15. A method of controlling an energy storage system, wherein the energy storage system includes a first energy storage device and a second energy storage device and wherein the second energy storage device has a different chemical composition for storing energy than the first energy storage device, the method comprising:
  monitoring a common connection point to the energy storage system for a power demand;
  setting a first level of power demanded equal to the power demand at the common connection point;
  detecting a change in the power demand at the common connection point;
  transferring energy between the first energy storage device and the common connection point via a first regulator responsive to the change in power demand at the common connection point;
  when the power demand remains not equal to the first level of power demanded for a first duration, decreasing the energy transferred between the first energy storage device and the common connection point and increasing energy transferred between the second energy storage device and the common connection point via a second regulator over a second duration; and
  when the power demand remains not equal to the first level of power demanded beyond the second duration, transferring energy between the second energy storage device and the common connection point.

16. The method of claim 15 wherein the first regulator includes a memory storing a threshold value and a processor operable to execute a counter and wherein when the first regulator is transferring energy between the first energy storage device and the common connection point the method further comprises the steps of:
  incrementing the counter with the processor,
  comparing the counter to the threshold value; and
  determining that the power demand has remained not equal to the first level of power demanded for the first duration when the counter exceeds the threshold value.

17. The method of claim 15 wherein:
  the second energy storage device includes a plurality of batteries,
  each of the plurality of batteries includes a second regulator operatively connected between the corresponding battery and the common DC bus, and
  increasing energy transferred between the second energy storage device and the common connection point includes increasing energy transferred between at least one of the second energy storage devices and the common connection point at a different time within the second duration than increasing energy transferred between at least one other of the second energy storage devices and the common connection point.

18. The method of claim 15 wherein the common connection point is a common DC bus operatively connected to each of the first and second regulators.

19. The method of claim 18 further comprising the steps of:
  setting a first low voltage setpoint and a first high voltage setpoint in the first regulator;
  setting a second low voltage setpoint and a second high voltage setpoint in the second regulator; and
  monitoring a DC voltage present on the common DC bus with each of the first regulator and the second regulator, wherein:
  the step of detecting a change in the power demand at the common connection point includes detecting a change in the DC voltage present on the common DC bus, and
  the step of transferring energy between the first energy storage device and the common connection point via a first regulator includes:
    comparing the DC voltage present on the common DC bus to the first low voltage setpoint and to the first high voltage setpoint, and
    transferring energy when the DC voltage present on the common DC bus is outside of a voltage band defined by the first low voltage setpoint and the first high voltage setpoint.

20. The method of claim 19 wherein the step of decreasing the energy transferred between the first energy storage device and the common connection point and increasing energy transferred between the second energy storage device and the common connection point includes adjusting the first low voltage setpoint less than the second low voltage setpoint when the DC voltage present on the common DC bus is initially less than the first low voltage setpoint and adjusting the first high voltage setpoint greater than the second high voltage setpoint when the DC voltage present on the common DC bus is initially greater than the first low voltage setpoint.

* * * * *